Nov. 26, 1963 D. E. PRIEST ETAL 3,111,970
TAPERED SABRE SAW BLADE
Filed May 26, 1961
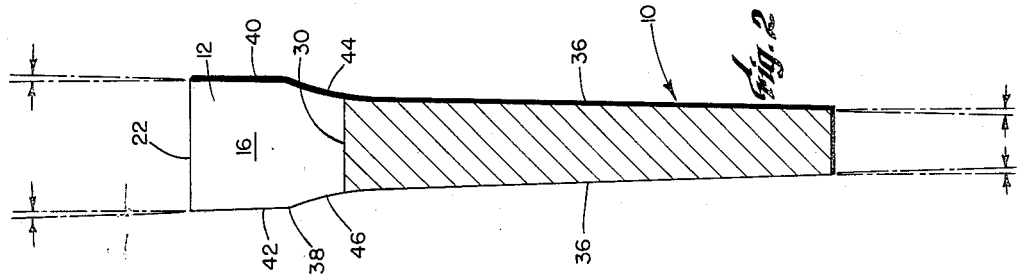
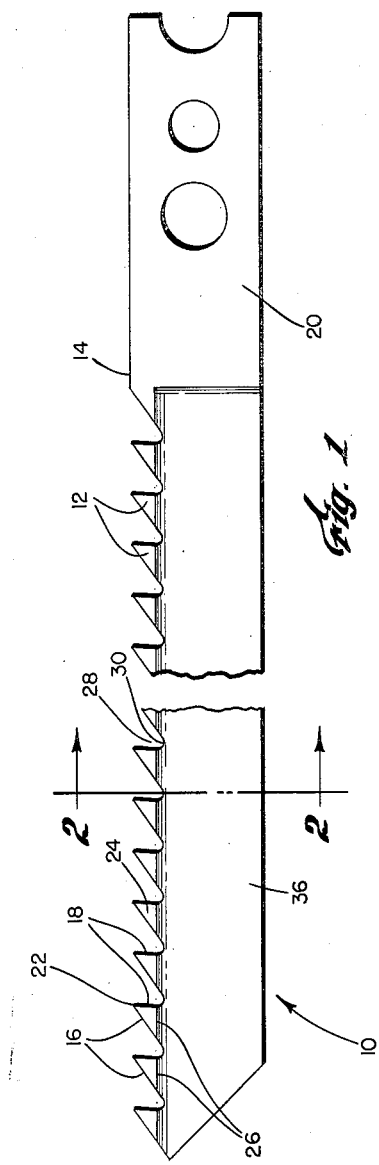
INVENTORS
John F. Ewig, Jr.
Dwight E. Priest, Deceased
By Emmy Lou Priest, Executrix
by Cedric W. Porter
Attorney

United States Patent Office 3,111,970
Patented Nov. 26, 1963

3,111,970
TAPERED SABRE SAW BLADE
Dwight E. Priest, deceased, late of Southborough, Mass., by Emmy Lou Priest, executrix, Love Lane, Southborough, Mass., and John F. Ewig, Jr., Worcester, Mass.
Filed May 26, 1961, Ser. No. 113,037
4 Claims. (Cl. 143—133)

This invention relates to a tapered sabre saw blade, so-called because its front end is usually pointed and is unsupported. Such a blade is usually used in a jig saw machine in a vertically reciprocating sawing stroke, but in starting a hole particularly, the blade may be used at an inclined angle. The blade may be used in cutting hard materials, such as metals, but is primarily intended to be used in cutting softer material, such as wood, plywood, plastic and the like. The same saw blade construction, however, can be used in a blade supported at both ends, as in a hack saw blade, and our invention is not limited in that respect. But for purposes of illustration we show our invention embodied in a sabre saw blade.

In all saw blades, clearance or space between the cutting edges of the teeth must be provided to permit chip clearance. Chip clearance is necessary for the saw to cut. Otherwise the saw merely binds in the kerf or cut being made in the material. Various methods have been employed to provide this necessary chip clearance, such as setting or alternate bending of the teeth laterally, and providing various shapes for the saw teeth. But when tooth clearance is secured by laterally projecting the tooth points, these points quickly wear away and proper clearance is lost. Further such laterally projecting points do not give a clean cut along the side walls of the kerf, tending to tear the material being cut to give clearance, and often deflect the saw from a straight line of cutting.

We have sought to overcome the defects and disadvantages of prior saw blades, and after experimenting with a great many shapes and forms of blades and teeth, we have designed a novel shape of sawtooth and blade, which provides great strength for the saw and teeth, proper chip clearance, and uniform cutting by all of the teeth on each of their sides and which permits the saw to be driven with less power, and with less wear and tear on the teeth.

We achieve our results by providing a saw blade formed from a blank having a thickened edge portion, on which flat cutting teeth are provided extending the width of the edge portion, and which taper slightly on their sides to a longitudinal ridge, or line more than half way down the teeth from the top to the bottom or gullet thereof and which then taper to substantially greater degree in a radial or concave taper extending to a point below the bottom or gullet of the teeth, at which point the taper is blended into the gradual taper of the rest of the saw blade. It will be understood that the remaining taper of the blade, as shown in FIG. 2, is unnecessary—and is desirable chiefly to prevent binding of the saw blade on the kerf and to permit the blade to cut in circles. The gradual tapering, from the top of the teeth, and then substantially greater radial or concave tapering of the blade below the midpoint of the teeth in the external contour give the blade great strength, and this shape of the blade and teeth provide superior chip clearance and superior cutting performance.

The advantages of our saw blade over the conventional set tooth type of saw blade are:

(1) The teeth are all even as far as width is concerned so every tooth does an equal amount of work. This is never true in a set-tooth blade because it is impossible to set teeth accurately enough to have each tooth do the same amount of work.

(2) As a result of this uniformity in tooth width, greater strength and longer life in our teeth is obtained, because every tooth is carrying the same load.

(3) The teeth cut faster for every tooth is doing an equal amount of work.

(4) Also the slot cut or kerf is narrower as there is no need to put a set on the teeth—and the narrower the cut the easier it is to cut.

(5) With every tooth doing the same amount of work as all the other teeth, a smooth cut or kerf is obtained.

(6) The slight taper and then the substantially increased radial taper, blending into the remaining taper to the back of the blade in addition to providing great strength, permits the gullet in the teeth to be placed low enough to provide adequate chip clearance.

Other features, advantages, objects and purposes of our invention will appear from a detailed description of the embodiment thereof, illustrated in the accompanying drawings, wherein:

FIG. 1 is a side elevation of a saw blade shank illustrating our invention, inverted with respect to its usual cutting position, and FIG. 2 is a vertical section of the saw blade shank shown in FIG. 1, taken along the line 2—2 of FIG. 1.

As shown in the drawings a saw blade shank 10 has thereon a plurality of cutting teeth 12 arranged in a row along one edge 14 of the said shank 10. Each of the teeth 12 has a leading face 16 and a trailing face 18, regarding the forward direction of sawing to be that in which the saw blade shank 10 is pushed by force exerted on its handle (not shown) from the end 20 of the said shank 10, toward the point of the saw blade.

The shape of the teeth are more or less conventional depending on the hardness of the material to be cut, and the speed and power with which the cutting is to be done. The leading face 16 of each tooth 12 is inclined upwardly preferably not more than 45° from the horizontal (or the tangent at its tip of cutting edge 22 to its usual sawpath). This insures that the force of the tangential component of the resistance of the material being cut (not shown) is never greater than the perpendicular component thereof, with respect to the usual path of cutting, thus protecting the saw teeth 12 against being broken off thereby. The more nearly horizontal the said leading face 16 is, the less the likelihood of a tooth 12 being broken off, other facts being constant; on the other hand, cutting efficiency may be correspondingly reduced. The trailing tooth face 18 is preferably inclined inwardly slightly beyond the perpendicular to the cutting path, as shown with reference to the perpendicular line 2—2 on FIG. 1, and blends into the bottom portion of the leading edge 16 at the gullet 30.

As stated above, the superior results achieved by our blade reside in the outside cross-sectional shape, or contour of our blade as shown in FIG. 2 of the drawing. The saw blade is formed from a blank having a thickened outer edge portion on which the saw teeth 12 are cut, as stated above. Each saw tooth 12 has a flat top cutting edge 22. Each tooth 12 then tapers downwardly on its sides 40 and 42 to a point more than half way between the top 22 and the gullet 30 of the tooth. As an illustration the taper from the top outside cutting edge on a blade having a width of .50 inch ranges from approximately 1 to 5 degrees, and is provided to prevent binding of the teeth in the kerf being cut in the work material. The degree of taper from the perpendicular is indicated by the dot-dash lines on the sides of the blade in FIG. 2 (not numbered). At this point, denoted by the ridge 38 (FIG. 2), a second taper is formed in the sides of the blade in substantially greater degree and in a radial or concave taper extending to a point below the bottom or gullet 30 of the teeth 12. At this point the second or concave taper denoted by 44 and 46 blends into the gradual taper denoted by the tapering sides 36 of the saw blade. As an illustration of the degree of taper, in a saw blade having a blade width of .050 inch would be drawn on a radius of .100 inch. As shown the second concave or radial taper 44 and 46 is substantially greater than the first taper 40 and 42, to provide chip clearance. It will be noted in FIG. 2 that the second taper extends below the point 30 or gullet of the teeth 12. In this way substantially greater strength is provided for the teeth 12, and this permits the gullet 30 in the teeth to be placed low enough to provide adequate chip clearance. It will be understood that the remaining taper of the blade denoted by the sides 36 may be omitted as non-essential. The remaining taper 36 is desirable chiefly to prevent binding of the saw blade in the kerf being cut and to permit the blade to cut in circles in the work material being operated on but it may be noted that the second and concave or radial side tapers 44 and 46, in blending into the taper 36 of the shank 10 provides side arch strength for the shank 10 and teeth 12.

It will be apparent that alternative embodiments and modifications of our invention disclosed herein may be made without departure from our invention as disclosed and claimed herein. Accordingly our disclosure is not to be construed as limited within the full scope of the appended claims.

We claim:
1. A saw blade formed from a blank having a thickened edge portion, edge cutting teeth formed in said thickened edge portion extending transversely thereof, each tooth having a straight top cutting edge extending the full width of said thickened edge, and tapering slightly downwardly on its sides to a point more than half way between the straight top cutting edge and the gullet of the tooth, and then tapering in substantially greater degree in a concave taper from the end of the first taper to a point below the gullet of the tooth.

2. A saw blade formed from a blank having a thickened edge portion, edge cutting teeth formed in said thickened edge portion extending transversely thereof, and being of uniform size and in longitudinal alignment with each other, each tooth having a straight top cutting edge extending the full width of said thickened edge, and tapering slightly downwardly on its sides to a point more than half way between the straight cutting edge and the gullet of the tooth, and then tapering in substantially greater degree in a concave taper from the end of the first taper to a point below the gullet of the tooth.

3. A saw blade comprising an elongated shaft having a bottom cutting edge and a top edge and spaced side walls having a greater thickness at the bottom than at the top, means at one end for attachment of the shaft to a driving member for reciprocal movement of the shaft longitudinally, longitudinally spaced cutting teeth formed on said bottom cutting edge and extending transversely thereof in uniform width and in longitudinal alignment with each other on said shaft, said teeth having a straight transverse cutting edge every point of which is equidistant from the plane of the top edge and having side walls having a first taper slightly downwardly from the top cutting edge to a point more than half way between the straight cutting edges and the gullets of the teeth, and having a second and concave taper from the end of the first taper to a point below the gullets of the teeth.

4. A saw blade as in claim 3, in which the second and concave taper merges into the remaining taper of the shaft to the top edge thereof.

References Cited in the file of this patent
UNITED STATES PATENTS

| | | |
|---|---|---|
| 2,646,094 | Russell | July 21, 1953 |
| 2,735,458 | Buchmann | Feb. 21, 1956 |
| 2,890,728 | Craven | June 16, 1959 |

FOREIGN PATENTS

| | | |
|---|---|---|
| 201,018 | Austria | Dec. 10, 1958 |